United States Patent [19]

Rendleman et al.

[11] Patent Number: 5,166,502
[45] Date of Patent: Nov. 24, 1992

[54] GAMING CHIP WITH IMPLANTED PROGRAMMABLE IDENTIFIER MEANS AND PROCESS FOR FABRICATING SAME

[75] Inventors: Thomas G. Rendleman; Spencer B. Hawerlander, both of Olathe, Kans.

[73] Assignee: Trend Plastics, Inc., Olathe, Kans.

[21] Appl. No.: 850,154

[22] Filed: Mar. 12, 1992

Related U.S. Application Data

[63] Continuation of Ser. No. 461,375, Jan. 5, 1990, abandoned.

[51] Int. Cl.⁵ .................... G06K 19/067; G09F 3/00
[52] U.S. Cl. .................... 235/492; 40/27.5; 29/602.1; 264/272.14; 264/272.17
[58] Field of Search ............ 235/488, 492; 273/85 G; 40/27.5; 264/272.14, 272.17; 29/602.1

[56]  References Cited

U.S. PATENT DOCUMENTS

| | | |
|---|---|---|
| 1,935,308 | 11/1933 | Baltzley . |
| 3,439,439 | 4/1969 | Stimson . |
| 3,670,524 | 6/1972 | Korwin . |
| 3,766,452 | 10/1973 | Burpee et al. ............ 40/27.5 X |
| 3,953,932 | 5/1976 | Graves ............ 40/27.5 |
| 3,968,582 | 2/1975 | Jones ............ 40/27.5 |
| 3,983,646 | 10/1976 | Howard ............ 40/27.5 |
| 4,399,910 | 12/1981 | Gutentag . |
| 4,435,911 | 3/1984 | Jones ............ 40/27.5 |
| 4,725,924 | 2/1988 | Juan ............ 235/492 X |
| 4,827,640 | 4/1987 | Jones ............ 40/27.5 |

Primary Examiner—John W. Shepperd
Attorney, Agent, or Firm—Kokjer, Kircher, Bowman & Johnson

[57]  ABSTRACT

An improved gaming chip and its fabrication process is provided wherein a discoidal insert having at least one label generally centered thereon is placed within the central aperture of a ring. A molding compound is formed over the ring and an outer peripheral portion of the insert thereby creating a lip over the outer peripheral edge of the label to prevent its removal. An electronic pre-encoded transponder may be placed within the ring prior to molding. When stimulated, the transponder will transmit encoded gaming chip identification information.

12 Claims, 2 Drawing Sheets

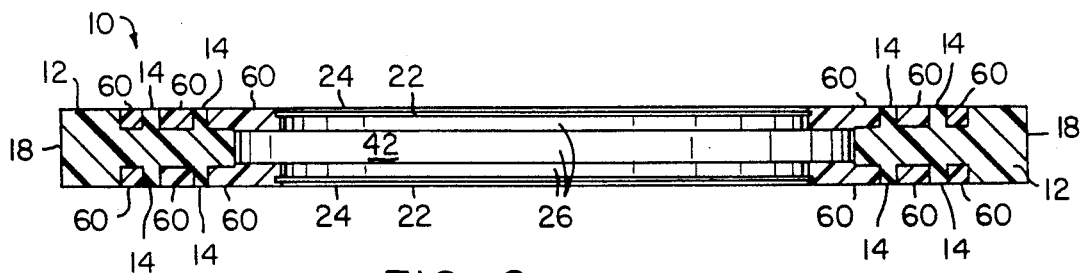
FIG. 6
FIG. 7
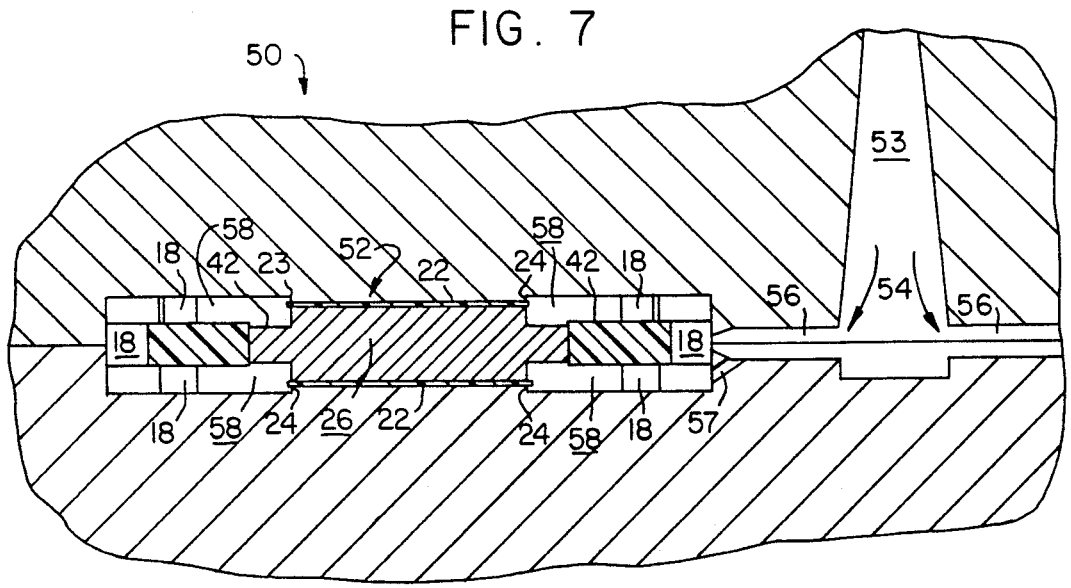
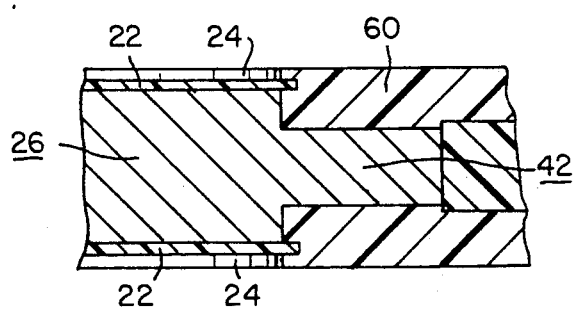
FIG. 8

5,166,502

GAMING CHIP WITH IMPLANTED PROGRAMMABLE IDENTIFIER MEANS AND PROCESS FOR FABRICATING SAME

This is a continuation of application Ser. No. 07/461,375, filed Jan. 1, 1990, abandoned.

FIELD OF THE INVENTION

This invention relates generally to gaming chips or tokens and a process for fabricating same. More specifically, this invention is directed to the fabricating process and the resulting unique gaming chip which utilizes an implanted electronic circuit encoded with identification information which may include but is not limited to casino designation, chip value, serial number and date of issue.

BACKGROUND OF THE INVENTION

Gaming chips of various denominational values are commonly used in games of chance. Different color schemes and design characteristics are used in accordance with different denominational chip values and casino designation. The different visual patterns have several purposes since it is desirable for both casino employees and game players to be able to readily discern chip values. Perhaps more importantly, it is necessary that the visual characteristics of a gaming chip are both permanent and complex enough so as to avoid counterfeiting. Toward this end, several common methods of forming gaming chips with definite designs on one or both surfaces presently exists.

One conventional method for making gaming chips utilizes a molding compound which is compressed into a discoidal chip. Various color combinations may be employed and colored inserts may be placed in cutaway portions along the outer periphery of the chip.

Another method of fabricating casino chips utilizes a discoid having projections which may represent a particular casino's logo and the denominational value of the token. A molding compound is formed over the discoid while allowing the projecting indicia to extend to the outer edge of the discoid.

Still another method of fabricating gaming chips is disclosed in U.S. Pat. No. 3,968,582 (Jones). This method utilizes to rings having offsets and indentations in an aligned manner to form one interlocking embodiment. A molding compound is applied to the embodiment and metal coins are received within a central opening.

To deter counterfeiting efforts, gaming chips may be coded with materials which "illuminate" when placed under a fluorescent lamp. Also, a detectable paint may be placed on the gaming chip which serves to enact an alarm system should the chip be maneuvered into or past a monitored area.

The gaming chips which result from the known manufacturing techniques (including the above) have several disadvantages. Each is capable of being counterfeited. Although the use of fluorescent film and metallic paint may result in the disclosure of a falsely duplicated token and possible token theft, respectively, the application of these materials does little in the way of automatically identifying pertinent token information.

Additional possibilities of accomplishing gaming chip identification were considered while conducting research with respect to the present invention. The following is a brief analysis including the disadvantages of each.

The use of magnetics offers two approaches to identifying an object. The first involves storing information on a magnetic strip and retrieving the information using a magnetic reader head. Usually the strip needs to be external to the gaming chip allowing contact between the strip and the reader head, resulting in aesthetic and wear problems, and risks of counterfeiting. Another magnetic approach entails embedding a magnet charged to a certain gauss level inside the gaming chip. Each casino would have a magnet charged to a different gauss level. A gauss meter would be used to read the gauss level to determine if the chip is a counterfeit. This type of system is not used for sorting gaming chip denominations; but only to check for a counterfeit. Also, the gauss level can be altered when an external magnet is put next to the poker chip.

Lasers may be utilized in gaming chip identification systems. In one application, bar coding can be placed either radially or in a straight line onto the chip. This results in the same types of problems as with the magnetic strip.

A laser could also be used to read a matrix system which employs a grid on the surface of the poker chip. Again, this system is not used for sorting, but only to check for counterfeits.

Vision/optics may be used for inspection of a gaming chip by comparing a actual chip to a stored image. Although the system can be used for sorting purposes, it can be fooled by an exact duplicate gaming chip. Additionally, gaming chips that have not been molded to a specific tolerance or possibly dirty gaming chips would be mistaken as counterfeit.

X-ray may be used in gaming chip identification systems. However, this type of system is hazardous and would require ample shielding to protect the operator and therefore is not a good application due to safety and feasibility reasons.

In sum, prior art gaming chips require closer and more time consuming inspection to discern denominational value and possible counterfeiting than is desirable and necessary with the gaming chip in accordance with the present invention. Additionally, the use of fluorescent coatings and metallic paints may become ineffective over time due to wear from use. Similarly, the use of magnetics, lasers, vision/optics, and x-ray devices all present problems that are avoided by the present invention.

SUMMARY OF THE INVENTION

The present invention provides for an improved gaming chip and a unique fabrication process. The utilization of a small encoded electronic device yields a gaming chip which is impossible to counterfeit, and easy to trace, sort and identify. It should be understood, however, that the scope of the present invention encompasses the chip, and its process, with and without the electronic device. The invention will be described herein including the electronic device, though it is understood it may be omitted.

The invention utilizes a programmable electronic circuit (transponder) which is encoded with desired identification information. The preferred electronic transponder used in accordance with the present invention is one designed by Indala Corporation and is similar to the identification products covered by U.S. Pat. No. 4,818,855. Each transponder has a unique code in alternating octal hex, an equivalence of 32 bits, resulting in thirty-four billion possible combinations. Information to be encoded may consist of, but is not limited to, casino designation, denominational chip value, serial number and date of issue. Once programmed, the electronic transponder is wired to a small antenna, preferably of the layered coil type. Alternatively, an antenna may be wound around a plastic ring (described later) to enhance signalling range.

A mounting vehicle in the general shape of a flat discoidal ring having a central aperature and with a thickness approximately equivalent to the overall thickness of the finished gaming chip is then employed to hold the transponder and antenna. The mounting vehicle may have a relatively narrow break channel, or slot, which extends from the interior of the vehicle to its outer edge and may receive an insert of dialectric material, if desired. Alternatively, the break channel may extend to a location near the mounting vehicle's outer periphery without extending entirely to the outer edge of the vehicle. Although the break channel is not necessary, its inclusion enhances transponder signalling, especially in an outwardly direction from the edge of the chip.

In one embodiment the transponder and accompanying antenna are positioned loosely within the break channel and center opening of the mounting vehicle, respectively. The invention is not limited to this transponder/antenna configuration and the transponder and antenna may be placed within the mounting vehicle in various arrangements. A liquid rubber-like or plastic-like epoxy is then formed around the transponder and antenna thereby filling the remaining space in the center of the mounting vehicle and break channel. The epoxy hardens to hold the transponder and antenna permanently in place. Alternatively, the transponder may be connected to an antenna which has been located around the periphery of the plastic ring. The transponder is then placed within the mounting vehicle a described while the antenna is encapsulated later during the molding process.

A plastic adhesive label with casino and denominational value representations may also be placed on one or both faces of the mounting vehicle. These are preferably made of clear plastic with the lettering on the back surface to prevent intentional or accidental destruction or alteration of the letters.

The mounting vehicle, complete with transponder and antenna, is then placed within the center of a ring, preferably made of plastic. The plastic ring is relatively flat and has various projections which extend from one or both of the rings facial surfaces. These projections desirably have a distinguishable color scheme and are in the form of a preferred design which may include, among other things, a particular casino's identifying indicia (or logo) and a denominational value. The outer periphery of the plastic ring is preferably shaped with several outer cutaway portions at evenly spaced intervals. This produces an outwardly extending hillock-like design formation around the ring's outer edge. Some of the outwardly extending hillocks are of increased thickness so as to extend to the edge of the chip's facial surfaces once the molding compound is applied. Color molded inserts may be placed within some or all of the cutaway portions to said gaming chip users in readily identifying the denomination and casino designation, and to further deter counterfeiting.

The inner periphery of the plastic ring is similar. It utilizes inner cutaway portions leaving inwardly extending projections. The innermost diameter of the plastic ring measured from the projections and the outermost diameter of the mounting vehicle are such that the mounting vehicle fits precisely within the plastic ring. Furthermore, the plastic ring is centered around the mounting vehicle in a balanced manner so as to leave proportional amounts of the thicker mounting vehicle extending from either face of the ring.

Once the plastic ring has received the mounting vehicle, the two are placed within a molding chamber of a molding apparatus. A molding compound of a desired color is introduced into the molding chamber. The compound surrounds the plastic ring and overlaps an outer rim portion of the mounting vehicle while flowing through the inner cutaway portions thereby permanently bonding the two pieces into a single one-piece gaming chip. The mold also forms a small lip over a portion of the outer peripheries of the adhesive labels so that the labels may not later be removed. The identifying surface projections on the facial surfaces of the plastic ring extend to the outer ridge of the molding compound so as to produce a distinguishable visual character design on the surface of the chip. Finally, after the chip is removed from the molding chamber, the gaming chip is flattened by grinding and its edges are turned smoothly.

The resulting product is a waterproof, durable, long-lasting and virtually impossible-to-counterfeit gaming chip. The electronic encoded transponder device is completely hidden within the chip and is non-reprogrammable.

In use, the transponder is electrically stimulated by a reading device which causes the electronic transponder to transmit the information stored in it. The reading device could be used in a slot machine, thereby identifying the value and validity of the gaming chip when it is completely inserted within the machine's slot. The reading device could also be used in a security reader or portal reader, though it is not limited to any of these applications. The encoded information which is read may then be processed by a computer or similar device. A computer program matches the encoded information with information stored in its data base and the decodes and outputs the information in a legible manner for immediate or later review.

The foregoing process immediately discriminates against invalid casino chips. For example, if the encoded casino designator is found in a particular chip, the casino name could appear on the computer monitor while the words "INVALID CASINO CHIP" could appear if no appropriate data base match is found.

Although endless possibilities for encoding information exist, one way of representing chip value may be to encode a chip with a number from one through nine (1-9) with each number representing a specific chip value. Also, the serial numbers for the chips would begin at 000001 for each casino designator. The computer program can then be modified for the appropriate casino designator each time a new casino is added.

Accordingly, it is an object of the present invention to provide a gaming chip and a process for fabricating same.

It is another object of the present invention to provide a gaming chip having a label molded therein, and a process for fabricating same.

Another object of the present invention is to provide a gaming chip, and its fabrication process, which is effectively molded with or without a transponder.

Another object of the present invention is to provide a virtually impossible-to-counterfeit gaming chip which utilizes a programmed electronic circuit encoded with identification information.

Another object of the present invention is to provide a gaming chip which is capable of being used in slot machines.

Another object of the present invention is to provide a gaming chip which allows immediate detection of invalid gaming chips.

A further object of the present invention is to provide a gaming chip which can automatically be sorted by value in a novel manner.

Another object of the present invention is to provide a gaming chip as described herein which allows the chips' denominational value to be counted faster, more efficiently, and more accurately than conventional chips with the said of electronic devices Another object of the present invention is to provide a gaming chip which may be tracked or traced within monitored areas thereby deterring theft.

Another object of the present invention is to provide a gaming chip which is capable of eliminating judgment by casino employees if so desired.

A further object of the present invention is to provide gaming chips which would allow casinos to use each other's chips if so desired through the use of appropriate encoding.

A further and significant object of the invention is to provide a unique gaming chip manufacturing method, including the steps of providing a substantially flat ring having a central aperture, locating a transponder within the aperture, and molding the ring and transponder to form the completed chip.

These and other objects, features, and advantages will become more readily apparent in the following description, with reference to the accompanying drawings.

BRIEF DESCRIPTION OF THE DRAWINGS

FIG. 6 is an enlarged cross-sectional view of the gaming chip of the present invention taken along line 6—6 of FIG. 1;

FIG. 7 is a schematic representing the molding process in accordance with the present invention; and FIG. 8 is an enlarged, fragmentary view detailing the portion of the chip of the present invention near its labels.

DETAILED DESCRIPTION OF THE DRAWINGS

Figure 1:
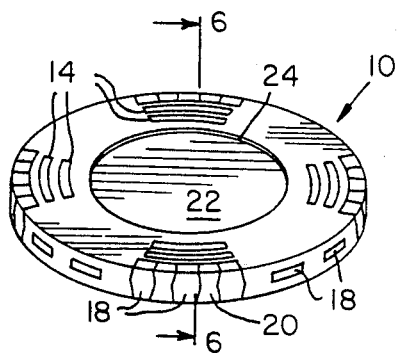
FIG. 1 is a perspective view of the gaming chip in accordance with the present invention.

Referring initially to FIG. 1, the preferred embodiment of the completed gaming chip of the present invention is generally denoted by the numeral 10. It is understood that chip 10 may be effectively formed with or without an implanted transponder. Chip 10 is formed of a colored molding compound which surrounds and is contiguous to a plastic ring 12 (see FIG. 4), preferably of a different color than the molding compound, having raised projections 14 from its facial surfaces which extend to the outer surfaces of chip 10 so as to become a visual characteristic on the exterior of the chip. Additionally, it is preferred that the ring 12 has outer recessed portions 16 along its outer periphery. This results in outwardly extending hillocks 18 remaining and extending to the edge of chip 10 (FIG. 1), thereby forming a distinct visual pattern on the edge thereof. Desirably, the outwardly extending hillocks 18 are proportionally smaller in the general vicinity of the raised projections 14 than the remaining hillocks 18 (as seen best in FIG. 4) and similarly extend to the facial surface of the chip (FIG. 1). The outer recessed portions 16 between the smaller raised hillocks 18 receive molded inserts 20 preferably of a color different than the molding compound.

Referring solely to FIG. 1, the chip 10 has an adhesive label 22 generally centered o each face thereof. As will be seen, the molding compound forms a small lip 24 over the edge of the label 22 to prevent its removal.

Figure 5:
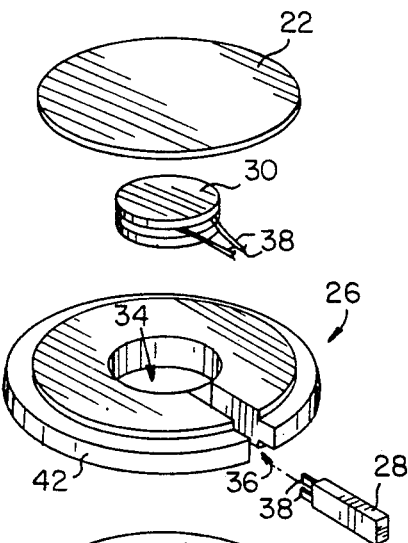
FIG. 5 is an exploded perspective view of portions of the present invention.
Figure 5:
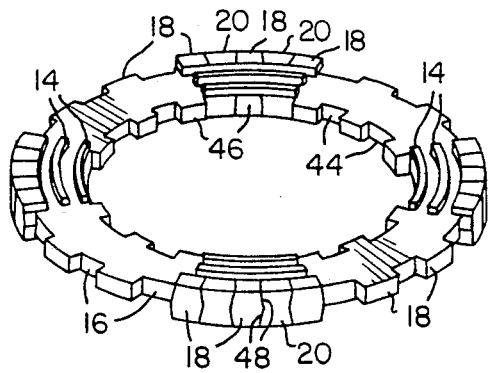

Referring now to FIGS. 2-5, the process of fabricating the gaming chip 10 will be described while describing the preferred embodiment of the part comprising the present invention. FIG. 5 shows an exploded perspective view of the chip 10 of the present invention prior to assembly and molding. Initially, a small electronic transponder 28 (of the type mentioned above) encoded with identification information is connected to an antenna 30, preferably of the layered coil type. The transponder 28 and accompanying antenna 30 are then placed within a mounting vehicle 26 (described later) and an epoxy is injected around the two to fill in the remaining space and hold the mounting vehicle in place. Alternatively, an antenna may be wound around the plastic ring 12, preferably located on one face and placed between raised projections 14 and hillocks 18. Labels 22 having adhesive 32 on one surface and bearing identifying indicia on its other surface are fixedly attached onto each face of the mounting vehicle 26.

Figure 2:
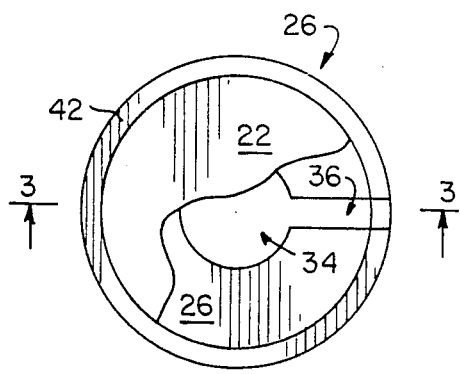
FIG. 2 shows a plan view of the mounting vehicle used in accordance with the present invention with a portion of the top adhesive label broken away so as to illustrate the mounting vehicle design.

Referring additionally to FIG. 2, the mounting vehicle complete with labels 22, but absent the transponder 28 and antenna 30, is shown with a portion of the top label 22 broken away. The mounting vehicle 26 is preferably made of brass and is generally shaped in a discoidal ring. The mounting vehicle 26 has a generally cylindrical opening 34 through its center portion. As shown, a narrow break channel 36 extends from the outer edge of the mounting vehicle 26 to the opening 34. A small insert composed of dialectric material may be inserted into the outer portion of break channel 36. Alternatively, the break channel 36 may be constructed so as to extend to a location near the mounting vehicle's outer periphery without extending entirely to the outer edge o the vehicle. The opening 34 receives the antenna 30 and the transponder 28 may be placed in the channel 36. The channel 36 is not necessary for the device to perform properly, however, it does enhance signalling from the transponder 28, primarily in an outwardly direction from the edge of chip 10, once the transponder 28 has been electrically stimulated.

Figure 3:
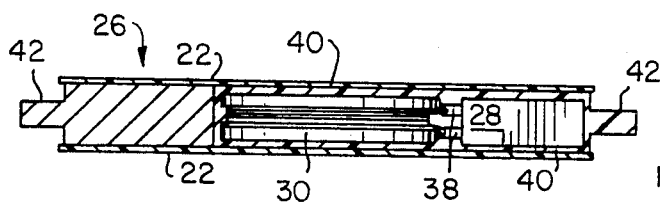
FIG. 3 is a side cross-sectional view of the mounting vehicle taken along line 3—3 of FIG. 2.

Referring additionally to FIG. 3, the transponder 28 is shown along with antenna 30 connected thereto at 38 and positioned as described within the mounting vehicle 26. The transponder 28 and antenna 30 are held firmly in place by epoxy 40.

As shown in both FIGS. 2 and 3, the mounting vehicle has an outer annular rim 42 formed when the mounting vehicle 26 abruptly narrows a proportional distance from either face to a lesser width near the vehicle's outer edge. As seen in FIG. 3, labels 22 preferably fit in a manner so as to extend slightly over rim 42. During the molding process, the molding compound covers rim 42 and permanently welds labels 22 inplace by forming lip 24 over an outer peripheral portion of the labels, as will become more readily apparent below.

Figure 4:
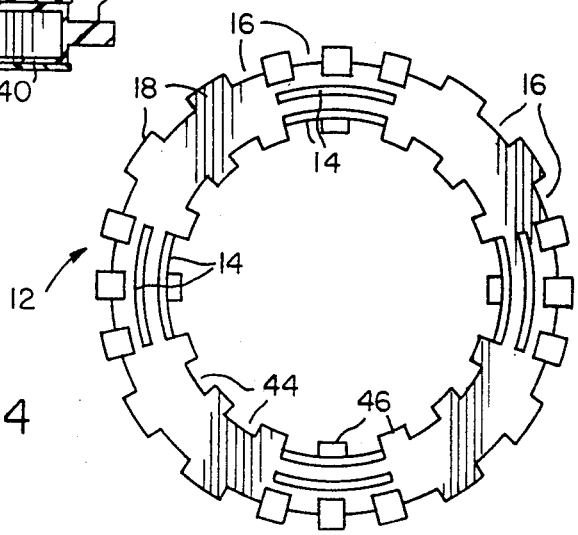
FIG. 4 is a top plan view of the plastic ring used in accordance with the present invention.

The mounting vehicle 26, complete with transponder 28 and antenna 30, is placed within the center of plastic ring 12 (FIGS. 4 and 5). The inner periphery of the ring 12 has inner recessed portions 44 leaving inwardly extending hillock-like projections 46. The outermost diameter and the circumference of the mounting vehicle 26 and the innermost diameter and the circumference of the ring 12, measured from the innermost tips of projections 46, is such that the mounting vehicle 26 precisely fits within the ring 12. The inner cutaway portions 44 will be filled with molding compound during the injection molding process described below to permanently bond the mounting vehicle 26 and the ring 12 together.

The outer recessed portions 16, between those outwardly extending hillocks 18 that have been raised so as to extend to the surface of the molding compound, once the molding compound has been applied, are filled with colored molded inserts 20 preferably having draft angles 48 to prevent removal of the inserts 20.

Referring now to FIG. 7, a schematic is shown which represents the molding apparatus 50 and the associated molding process. The ring 12, with the mounting vehicle 26 positioned in its center, which now forms a skeleton of the gaming chip 10, is placed in molding (multi) chamber 52 of molding apparatus 50. The skeleton of the gaming chip rests so that the ring 12 is centered evenly around the mounting vehicle 26. Thermoplastic is introduced through sprue 53 in the direction of arrows 54. The thermoplastic flows through runners 56 and enters the chamber 52 through a small gate 57, preferably of the submarine type. The thermoplastic molding compound is compressed into all spaces around and through the skeleton. These spaces are generally denoted 58, and particularly show the formation of molding compound over the outer annular rim 42 of mounting vehicle 26. Furthermore, molding compound flows through and fills the inner recessed portions 44 thereby interlocking mounting vehicle 26 and the ring 12 permanently together. Additionally, molding compound fills any outer recessed portions 16 having no inserts 20. As stated before, the molding compound forms a small lip 24 over the outer periphery of the labels 22. As seen in FIG. 6, molding compound 60 forms around and contiguous to ring 12 allowing raised projections 14 of ring 12 to extend to the surface of the molding compound 60. The mounting vehicle 26, complete with transponder 28 and antenna 30 (not visible), is positioned in the center of chip 10 so that the adhesive labels 22 extend to the chip surface, with a small lip 24 of the molded plastic 60 extending over the outer periphery of the labels 22. As seen best in FIG. 8, the molded plastic 60 forms a weld around the outer peripheries of labels 22 which extend over rim 42, thereby forming lip 24. The completed chip forms a waterproof embodiment so that the internal electronic device may not be destroyed when subjected to moisture. Due to the location of cross section line 6—6, (FIG. 1), FIG. 6 also shows the raised outerwardly extending hillocks 18 extending to the surface of the chip 10.

The chip is finally removed from the molding apparatus 50 and is ground to flatten its surfaces and smooth its edges.

In use, the electronic transponder 28 may be stimulated by a reading device as discussed herein to retrieve the encoded identification information. This information can be processed to yield legible data to said in the detection of theft of chips, counterfeit tokens, denominational value of the chips, casino designation of the chips, serial numbers of the chips, and other possible identification information.

It is to be understood that the foregoing is a preferred embodiment and is not limited to the various details described herein and that variations and modifications may be effected without departing from the spirit and scope of the novel concepts of the present invention.

We claim:

1. A process for fabricating gaming chips, said process including the steps of:
    providing a substantially flat ring having a central aperture therein;
    locating an insert having at least one label fixed thereon within said aperture; and
    forming thermoplastic molding compound around said ring and at least an outer peripheral edge portion of said label, thereby permanently locking said ring and said insert together and forming a lip over said outer peripheral edge portion of said label.

2. The process of claim 1, wherein said locating step further comprises said insert having at least one outer face having a periphery, and said label being mounted on said outer face and having at least portions of said periphery of said label extending outwardly beyond the periphery of said insert.

3. A process for fabricating a gaming chip, said process including the steps of:
    providing a substantially flat ring having a central aperture therein;
    locating a transponder within said aperture;
    forming thermoplastic molding compound around said ring and transponder to form said gaming chip; and
    encoding said transponder with retrievable gaming chip identification information, said identification information including at least one identifier from the group consisting of issuing casino, gaming chip value and individual gaming chip identification number.

4. The process as in claim 3, including, prior to said forming step, the steps of:
    connecting an antenna with said transponder; and
    locating said connected antenna and transponder on a mounting vehicle, and
    wherein said step of locating comprises:
        locating said mounting vehicle and antenna/transponder combination in said flat ring.

5. The process as in claim 3, wherein said encoding step is performed prior to said forming step.

6. A gaming chip comprises of:
    a substantially flat ring having a central aperture therein;
    an insert having at least one label fixed thereon within said aperture; and thermoplastic molding compound formed around said ring and at least an outer peripheral portion of said label, said label thereby having a small lip formed over said outer peripheral portion.

7. The gaming chip of claim 6, wherein said insert has at least one outer face having a periphery, and said label is mounted on said outer face with at least portions of said periphery of said label extending outwardly beyond the periphery of said insert.

8. A gaming chip, said chip comprising:
interlocking portions, each portion having a central aperture therein; and
a transponder, said interlocking portions fixedly locating said transponder within said apertures, said transponder being encoded with and capable of transmitting chip identification information, said identification information including at least one identifier from the group consisting of issuing casino, gaming chip value and individual gaming chip identification number.

9. The combination as in claim 8, including a label having chip identifying indicia visually located within said chip, at least one of said apertures of said interlocking portions extending over, and thereby forming a lip over, at least an outer peripheral edge portion of said label to prevent removal thereof.

10. The gaming chip of claim 8 furthermore being waterproof to protect said transponder.

11. The gaming chip as set forth in claim 8 wherein: said interlocking portions include a mounting vehicle precisely fitting within a generally flat ring, said transponder being connected to an antenna and said transponder/antenna combination encapsulated within said mounting vehicle, and said identifying indicia is composed of a label having a peripheral portion and at least one of said interlocking portions extends at least over said peripheral portion of said label, said label thereby having a small lip formed over said peripheral portion.

12. The gaming chip of claim 11, wherein said mounting vehicle has at least one outer face having a periphery, and said label is mounted on said outer face with at least portions of said periphery of said label extending outwardly beyond the periphery of said mounting vehicle.

* * * * *